United States Patent [19]

Leroy et al.

[11] 4,085,099
[45] Apr. 18, 1978

[54] WATER-INSOLUBLE NITROPHENYLAZOPHENYL COMPOUNDS CONTAINING A TERMINAL —N—$(CH_2)_n$—O—CO— OR —CO—O—$CH_2$—$CH_2$—$C_3F_5$ GROUP

[75] Inventors: Jean Marie Louis Leroy, Saint Etienne du Rouvray; Jacques Pierre Edmond Pechmeze, Paris, both of France

[73] Assignee: Produits Chimiques Ugine Kuhlmann, Paris, France

[21] Appl. No.: 457,681

[22] Filed: Apr. 3, 1974

[30] Foreign Application Priority Data

Apr. 13, 1973  France .................... 73.13393

[51] Int. Cl.² .............. C09B 29/00; C09B 29/08; C09B 29/26; C09B 31/04
[52] U.S. Cl. ........................... 260/207; 8/26; 260/158; 260/187; 260/465 D; 260/562 B; 560/20; 560/24; 560/38; 560/227
[58] Field of Search ............ 260/187, 207, 207.1, 260/471 R, 487; 8/26

[56] References Cited

U.S. PATENT DOCUMENTS

| | | | |
|---|---|---|---|
| 2,470,094 | 5/1949 | Dickey et al. | 260/205 |
| 2,516,302 | 7/1950 | Dickey | 260/207.1 X |
| 2,516,303 | 7/1950 | Dickey | 260/207.1 X |
| 2,723,264 | 11/1955 | Dickey et al. | 260/207 |
| 3,178,405 | 4/1965 | Merian | 260/207 |
| 3,335,126 | 8/1967 | Baron et al. | 260/207.1 |
| 3,406,164 | 10/1968 | Altermatt et al. | 260/207 |
| 3,406,165 | 10/1968 | Kruckenberg | 260/207.1 |
| 3,407,189 | 10/1968 | Merian | 260/207.1 |
| 3,520,817 | 7/1970 | Zanella | 260/207 |

*Primary Examiner*—Floyd D. Higel
*Attorney, Agent, or Firm*—Beveridge, DeGrandi, Kline & Lunsford

[57] ABSTRACT

Dyestuffs falling within the formula:

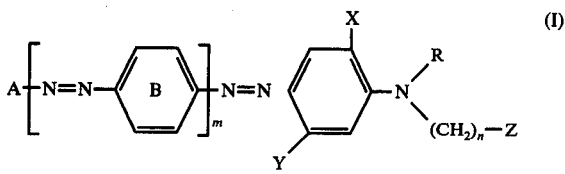

in which A represents the residue of a diazotizable amine free from substituents giving rise to an acid dissociation, m is 0 or 1, the benzene nucleus B may be substituted by methyl or methoxy groups, X represents a hydrogen atom or a methyl, methoxy or ethoxy group, Y represents a hydrogen or chlorine atom or a methyl, methoxy or acylamino group, n is 1, 2 or 3, Z represents —O—CO—$CH_2CH_2C_2F_5$ or —CO—O—$CH_2CH_2C_2F_5$ or, provided that Y is —NHCO—$CH_2CH_2C_2F_5$, a hydrogen atom or a hydroxy, cyano, alkoxycarbonyl or acyloxy group, and R represents a substituted or unsubstituted alkyl group of low molecular weight or —$(CH_2)_n$—Z wherein n and Z have the meanings given above; mixture of such dyestuffs; processes for their preparation; process for the coloration of hydrophobic fibres in which the coloring agent is a dyestuff of the formula given above or a mixture thereof; textile materials dyed or printed with a dyestuff of the formula given above or with a mixture thereof and intermediate products of the formula:

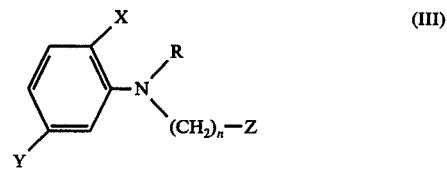

4 Claims, No Drawings

WATER-INSOLUBLE NITROPHENYLAZOPHENYL COMPOUNDS CONTAINING A TERMINAL —N—(CH₂)ₙ—O—CO— OR —CO—O—CH₂—CH₂—C₃F₅ GROUP

The present invention relates to new water insoluble azo dyestuffs, which are especially interesting for the colouration of hydrophobic fibres, to processes for their preparation and to their uses.

According to the present invention new dyestuffs are provided having the general formula:

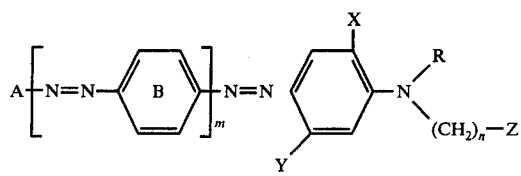

in which A represents the residue of a diazotisable amine free from substituents giving rise to an acid dissociation, such as sulphonic or carboxylic acid groups, $m$ is 0 or 1, the benzene nucleus B may be substituted by methyl or methoxy groups, X represents a hydrogen atom or a methyl, methoxy or ethoxy group, Y represents a hydrogen or chlorine atom or a methyl, methoxy or acylamino group, $n$ is 1, 2 or 3, Z represents —O—CO—CH₂CH₂C₂F₅ or —CO—O—CH₂CH₂C₂F₅ or provided that Y is —NHCO—CH₂CH₂C₂F₅, a hydrogen atom or a hydroxy, cyano, alkoxycarbonyl or acyloxy group, and R represents a substituted or unsubstituted alkyl group of low molecular weight or —(CH₂)ₙ—Z where $n$ and Z have the meanings given above.

The acyl residue of the acylamino group represented by Y may be that of an aliphatic, aromatic or araliphatic acid. Examples of acylamino groups that may be more particularly mentioned are formylamino, acetylamino, 4,4,5,5,5-pentafluoro-valerylamino, benzoylamino, phenylacetylamino or cinnamoylamino. As will be seen from the above, Y may also be hydrogen, chlorine, methyl and methoxy.

The alkoxy residue of the alkoxycarbonyl group which Z may represent if Y is a —NHCO—CH₂CH₂C₂F₅ residue is preferably an alkoxy group containing 1 to 4 carbon atoms, such as methoxy, ethoxy, propoxy or butoxy.

The acyloxy group which Z may represent if Y is a —NHCO—CH₂CH₂C₂F₅ residue may be for example an acetyloxy, propionyloxy, butyryloxy or valeryloxy.

When R represents an alkyl group of low molecular weight, this preferably contains 1 to 4 carbon atoms and may be substituted by one hydroxy, cyano, alkoxycarbonyl or acyloxy group such as those enumerated above.

The dyestuffs according to the invention may be prepared for example in a general way by coupling the diazo derivative of an amine of the formula:

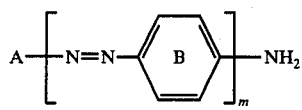

with a compound of the formula:

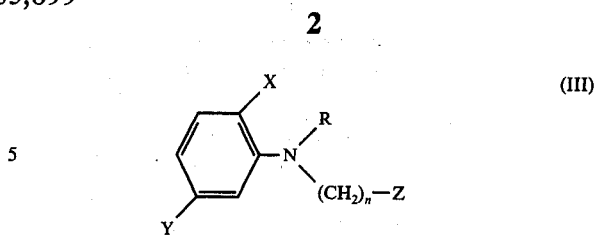

A, B, X, Y, Z, R, $m$ and $n$ being as defined above.

The diazotisation of the amines of formula (II) may be effected for example, by means of a mineral acid, especially hydrochloric acid, and sodium nitrite or by means of a solution of nitrosyl-sulphuric acid dissolved in sulphuric acid with the possible addition of acetic acid or of a mixture of acetic and propionic acids. The coupling is effected in a neutral or acid medium, possibly in the presence of a buffering substance acting on the speed of coupling, such as sodium acetate.

Instead of using a single coupling compound of formula (III), a mixture of coupling compounds of formula (III) may be used.

The amines of formula (II) in which $m$ is equal to 1 may themselves be prepared for example by coupling the diazo derivative of an amine A—NH₂ with an aminobenzene of the formula:

The coupling compounds of formula (III) in which Z represents —O—CO—CH₂CH₂C₂F₅ may be prepared for example by the action of 4,4,5,5,5-pentafluoro-valeryl chloride on a compound of the formula:

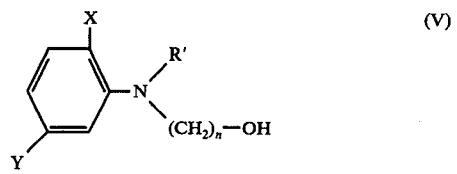

in the presence of a tertiary amine, such as for example pyridine, or of an excess of the compound of formula (V), In formula (V) X, Y and $n$ have the same significance as above and R' represents a residue —(CH₂)ₙ—OH or an alkyl group of low molecular weight which contains preferably 1 to 4 carbon atoms and may be substituted by one substituent such as those above mentioned for R.

The coupling compounds of formula (III) in which Z represents —CO—O—CH₂CH₂C₂F₅ may be prepared, for example, by esterification of an acid of the formula:

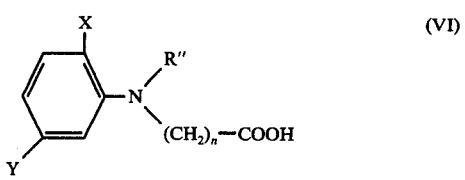

by means of 3,3,4,4,4-pentafluoro-butanol. In formula (VI), X, and Y and $n$ have the same significance as above and R" represents an alkyl group of low molecular weight containing preferably 1 to 4 carbon atoms or —(CH$_2$)$_n$—COOH.

Finally, the coupling compounds of formula (III) in which Y represents a —NHCO—CH$_2$CH$_2$C$_2$F$_5$ group may be prepared, for example, by condensation of 4,4,5,5,5-pentafluoro-valeryl chloride with an amine of the formula:

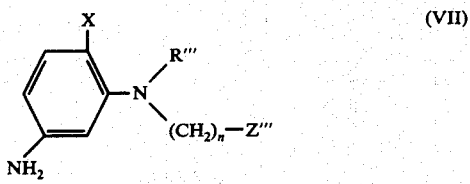

in which X has the same significance as above, R''' represents a residue —(CH$_2$)$_n$—Z''' or an alkyl group of low molecular weight which contains preferably 1 to 4 carbon atoms and may be substituted by one substituent such as those above-mentioned for R, and Z''' represents a hydrogen atom or a hydroxy, cyano or alkoxycarbonyl group, said alkoxycarbonyl group containing 2 to 5 carbon atoms.

Preferred amines of formula (II) are those of the following formula:

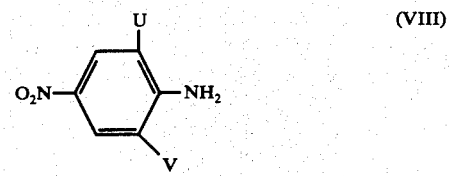

in which U and V may be the same or different and each represents a hydrogen or halogen atom or a nitro, cyano, alkoxycarbonyl group containing 2 to 5 carbon atoms or an alkylsulphonyl group containing 1 to 4 carbon atoms.

Other examples of amines of formula (II) are 4-chloro-aniline, 4-amino-benzonitrile, 1-amino-2,4-dicyano-benzene, 4-methylsulphonyl-aniline, the methyl or ethyl ester of p-amino-benzoic acid, 2,4-dichloro-aniline, 4-chloro-2-trifluoromethylaniline, 2-amino-5-chloro-benzonitrile, 4-chloro-2-methoxycarbonylaniline, 2,5-dimethoxy-4-amino-azobenzene, 4-amino-azobenzene, 4-amino-3,3'-dimethyl-azobenzene, 4-amino-2-methyl-5-methoxy-azobenzene, 4-amino-3,5-dichloro-benzonitrile, 2-amino-6-acetyl-benzothiazole, 2-amino-6-methylsulphonyl-benzothiazole, 2-amino-6-chloro-benzothiazole, 2-amino-6-nitro-benzothiazole, 2-amino-6-cyano-benzothiazole, 2-amino-6-methoxy(or ethoxy) carbonyl-benzothiazole, 2-amino-5-nitrothiazole, 2-amino-5-nitro-1,3,4-thiadiazole, 5-amino-3-methylthio-1,2,4-thiadiazole, 3-amino-5-nitro-2,1-benzisothiazole or 5-amino-3-methyl-4-nitroisothiazole.

The dyestuffs of formula (I) in which Z represents —O—CO—CH$_2$CH$_2$C$_2$F$_5$ may be prepared for example by esterifying a compound of the formula:

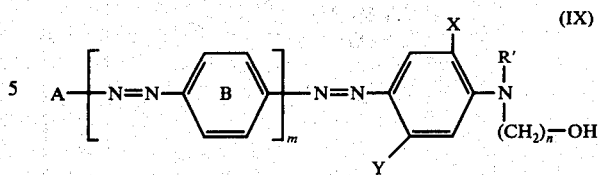

in which A, B, X, Y, m, n, and R' are as defined above, with 4,4,5,5,5-pentafluoro-valeric acid or of a functional derivative of this acid (i.e. any derivative capable of providing the acyl residue of the acid), for example the chloride or anhydride of the acid. The mono- or di-acylation is effected preferably in an inert organic solvent such as for example pyridine, benzene, dioxan or dimethyl formamide.

The dyestuffs of formula (I) in which Z represents a —CO—O—CH$_2$CH$_2$C$_2$F$_5$ may also be prepared for example by esterification of a compound of the formula:

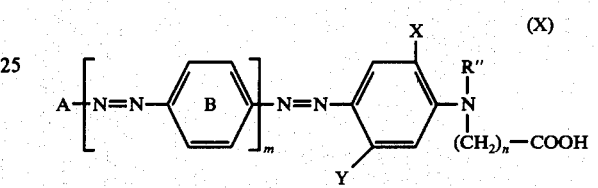

in which A, B, X, Y, m, n and R" are as defined above, with 3,3,4,4,4-pentafluoro-butanol. This mono- or di-esterification may be carried out in the presence of small quantities of sulphuric acid or of any other esterification catalyst.

The new dyestuffs are very suitable for dyeing and printing various articles, especially fibres and fabrics, for example, based on cellulose diacetate or triacetate and polyamides, but above all based on aromatic polyesters. Full-bodied shades which are very fast, particularly to light and sublimation, are obtained. The new dyestuffs are also very suitable for dyeing textured yarns based on polyesters. They may be used for transfer printing techniques and their relatively great solubility in solvents permits their use for continuous dyeing in a solvent medium.

With a view to tinctorial applications, it is advantageous that the new dyestuffs should be in a finely divided state. This is why the dyestuffs according to the invention are preferably previously dispersed with dispersing agents, such as soap, residual cellulose sulphite liquor, the products resulting from the condensation of naphthalenesulphonic acids with formaldehyde, especially dinaphthylmethane-disulphonates, the esters of sulphonated succinic acid, the products obtained by condensation of the cresols with formaldehyde and the naphtholsulphonic acids.

The dyeing of the polyester fibres may be carried out in the presence of a carrier at a temperature ranging from 80° to 125° C. or without a carrier under pressure at a temperature from about 100° to 140° C. They may also be foularded or printed with an aqueous dispersion of the new dyestuff, then the impregnation obtained is fixed at a temperature from 140° to 220° C., for example by means of superheated steam, air or by contact with a heating surface. The range of temperature from 180° to 200° C. is particularly favourable.

Instead of impregnation, the dyestuffs according to the invention may also be applied by printing. For example, a printing colour is used for this purpose which contains in addition to the auxiliary agents commonly used in printing, such as wetting agents and thickeners, the finely dispersed dyestuff, possibly in admixture with a dyestuff for cotton if a mixed fabric containing cotton is to be printed, and in the presence of urea and/or of an agent which binds the acids.

The invention is illustrated by the following Examples in which the parts indicated are parts by weight, unless the contrary is stated.

EXAMPLE 1

0.7 Parts of sodium nitrite are dissolved in 15 parts of 63°Be sulphuric acid, then 1.63 parts of 2-amino-5-nitro-benzonitrile are gradually introduced. Then the solution of the diazo derivative thus obtained is poured on 100 parts of ice, the excess of nitrite is destroyed and a solution of 3.53 parts of N-ethyl-N-[2-(4,4,5,5,5-pentafluoro-valeryloxy)ethyl]-metatoluidine in 25 parts of glacial acetic acid is added. After about an hour, the mixture is run on to 100 parts of water and ice and filtered. The dyestuff thus obtained dyes the polyester fibres a ruby shade which is very fast to light and to sublimation.

The N-ethyl-N-[2-(4,4,5,5,5-pentafluoro-valeryloxy)-ethyl]-metatoluidine used in this Example may be prepared as follows:

10.66 Parts of 4,4,5,5,5-pentafluoro-valeryl chloride, 7.5 parts of N,N-diethylaniline and 9 parts of N-ethyl-N-hydroxyethyl-metatoluidine are introduced into 15 parts of xylene. The mixture is then refluxed for 6 hours, then the reaction mass is run into 50 parts of water and 6.5 parts of a solution of 35°Be sodium hydroxide, is allowed to settle and distilled under vacuum. The desired product distils over towards 154° C. under 4 mm of mercury or 160° C. under 5 mm of mercury.

The following Table sets out other Examples of dyestuffs according to the invention, prepared as in Example 1 by coupling the diazo derivative of the diazotisable amine indicated in the second column with the coupling compound indicated in the third column.

| Example | Diazotisable amine | Coupling compound | Shade on polyester fibres |
|---|---|---|---|
| 2 | 2-amino-3-chloro-5-nitro-benzonitrile | N-ethyl-N-[2-(4,4,5,5,5-pentafluoro-valeryloxy)-ethyl]-meta-toluidine | red-violet |
| 3 | 4-amino-azobenzene | " | red |
| 4 | 5-amino-3-methyl-4-nitro-isothiazole | " | violet |
| 5 | 5-amino-3-methylthio-1,2,4-thiadiazole | " | bordeaux |
| 6 | 2-chloro-4-nitro-aniline | N-ethyl-N-[2-(4,4,5,5,5-pentafluoro-valeryloxy)-ethyl]-aniline | scarlet |
| 7 | 2,6-dichloro-4-nitro-aniline | N-cyanoethyl-N-[2-(4,4,5,5,5-pentafluoro-valeryloxy)-ethyl]-aniline | yellow-brown |
| 8 | 2-amino-5-nitro-thiazole | N-cyanoethyl-N-[2-(4,4,5,5,5-pentafluoro-valeryloxy)-ethyl]-aniline | violet |
| 9 | 2-amino-6-ethoxy-carbonyl-benzothiazole | " | red |
| 10 | 2-amino-6-nitro-benzothiazole | " | red |
| 11 | 4-nitro-aniline | N-ethyl-N-[2-(4,4,5,5,5-pentafluoro-valeryloxy)-ethyl]-2-methoxy-5-methyl-aniline | red |
| 12 | 2-ethoxycarbonyl-4-nitro-aniline | N-ethyl-N-[2-(4,4,5,5,5-pentafluoro-valeryloxy)-ethyl]-3-chloro-aniline | red |
| 13 | 2-methylsulphonyl-4-nitro-aniline | N,N-bis-[2-(4,4,5,5,5-pentafluoro-valeryloxy)-ethyl]-meta-toluidine | red |
| 14 | 2-amino-5-nitro-1,3,4-thiadiazole | N,N-bis-[2-(4,4,5,5,5-pentafluoro-valeryloxy)-ethyl]-N'-acetyl-m-phenylenediamine | red-orange |
| 15 | 2-amino-5-nitro-benzonitrile | " | violet |
| 16 | 3-amino-5-nitro-2,1-benzisothiazole | N,N-dimethyl-N'-(4,4,5,5,5-pentafluoro-valeryl)-m-phenylenediamine | blue |
| 17 | 2-chloro-4,6-di-nitro-aniline | " | reddish blue |
| 18 | 2-amino-3,5-dinitro-benzonitrile | " | blue |
| 19 | 2-amino-5-chloro-benzonitrile | N-ethyl-N-[2-(3,3,4,4,4-pentafluoro-butoxy-carbonyl)-ethyl]-meta-toluidine | red-orange |
| 20 | 2-chloro-4,6-dinitro-aniline | N-ethyl-N-[2-(3,3,4,4,4-pentafluoro-butoxy-carbonyl)-ethyl]-meta-toluidine | violet |
| 21 | 2-amino-5-nitro-benzonitrile | " | ruby |
| 22 | " | N-ethyl-N-[2-(4,4,5,5,5-pentafluoro-valeryloxy)-ethyl]-N'-acetyl-m-phenylenediamine | ruby |
| 23 | 2-amino-5-nitro-benzonitrile | N-ethyl-N-[2-(3,3,4,4,4-pentafluorobutoxycarbonyl)-ethyl]-N'-benzoyl-m- | violet |

-continued

| Example | Diazotisable amine | Coupling compound | Shade on polyester fibres |
|---|---|---|---|
| 24 | 2-amino-5-nitro-benzonitrile | phenylenediamine N-ethyl-N-[2-(3,3,4,4,4-pentafluoro-butoxycarbonyl)-ethyl]-N'-phenylacetyl-m-phenylene-diamine | violet |
| 25 | " | N-cyanoethyl-N-[2-(3,3,4,-4,4-pentafluoro-butoxycarbonyl)-ethyl]-N'-acetyl-m-phenylene diamine | red-violet |
| 26 | 2-amino-5-nitro-benzonitrile | N,N-bis-[2-(4,4,5,5,5-pentafluoro-valeryloxy)-ethyl]-5-cinnamoylamino-2-methoxy-aniline | blue-violet |
| 27 | " | N,N-diethyl-2-methoxy-5-(4,4,5,5,5-pentafluoro-valerylamino)-aniline | red-violet |
| 28 | 2-amino-3-bromo-5-nitro-benzo-nitrile | N,N-diethyl N'-(4,4,5,5,5-pentafluoro valeryl)meta-phenylenediamine | blue |
| 29 | 2-bromo-4,6-dinitro-aniline | " | " |
| 30 | 2-chloro-4,6-dinitro-aniline | " | " |
| 31 | 2-amino-3,5-dinitro-benzonitrile | " | " |

By way of example the N-ethyl-N-[2-(3,3,4,4,4-pentafluorobutoxycarbonyl)-ethyl]-meta-toluidine may be prepared in the following manner:- A mixture of 24.35 parts of N-ethyl-N-(2-carboxy-ethyl)-meta-toluidine hydrochloride and 35 parts of 3,3,4,4,4-pentafluoro-butanol is heated under reflux (105° C.) for 6 hours. After distillation of excess alcohol, the desired product is obtained sufficiently pure to be used as coupling compound.

The N,N-dimethyl-N'-(4,4,5,5,5-pentafluoro-valeryl)-m-phenylenediamine may be prepared as follows: 13.6 parts of freshly distilled N,N-dimethyl-meta-phenylenediamine are introduced into a mixture of 30 parts of xylene and 15 parts of N,N-diethylaniline, then 21 parts of 4,4,5,5,5-pentafluorovaleryl chloride are added. The temperature rises spontaneously to 100° C. and the mixture is then heated under reflux for two hours, and the reaction mass is then poured into 150 parts of water at 60° C. with vigorous stirring. The product is filtered and the filtered mass is taken up in 50 parts of hot water, the mixture is acidified to pH 2 by addition of hydrochloric acid, treated with carbon black and filtered. Sodium carbonate is added to the filtrate until precipitation is complete, the precipitate is filtered off and dried. 24 parts of N,N-dimethyl-N'-(4,4,5,5,5-pentafluoro-valeryl)metaphenylenediamine are thus obtained.

| Analysis | C% | N% | F% |
|---|---|---|---|
| Calculated for $C_{13}H_{15}F_5N_2O$ | 50.32 | 9.03 | 30.64 |
| Found | 50.00 | 9.06 | 30.17 |

EXAMPLE 32

3.53 Parts of 2-cyano-4-nitro-2'-methyl-4'-(N-ethyl-N-hydroxyethyl-amino)-azobenzene obtained by coupling the diazo derivative of 2-amino-5-nitro-benzonitrile with N-ethyl-N-hydroxyethyl-meta-toluidine are dissolved in 100 parts of pyridine. The solution is cooled to 10°-15° C. then 2.2 parts of 4,4,5,5,5-pentafluorovaleryl chloride are gradually added at this temperature. The mixture is stirred for a further 2 hours at 10°-15° C., then poured on 250 parts of ice and the mixture is acidified to pH 3-4 by the addition of concentrated hydrochloric acid, while cooling with ice. The dyestuff thus obtained is filtered off and washed until the washings are neutral. It dyes polyester fibres in a ruby shade which is remarkably fast to light and sublimation.

EXAMPLE 33

A fabric of ethylene glycol polyterephthalate fibres is printed with a printing paste containing 20 parts of the dyestuff described in Example 21, 150 parts of a sodium salt of sulphonated castor oil, 600 parts of a thickener and 250 parts of water. After drying, the fabric is heat-set for a minute at 200° C. and then subjected to a reducing treatment. A ruby shade of good general fastness is obtained.

EXAMPLE 34

A fabric of ethyleneglycol polyterephthalate fibres is foularded in a bath comprising 9 parts of the dyestuff of Example 27, 0.5 parts of a polyglycol ether of oleyl alcohol, 1.5 parts of a polyacrylamide and 989 parts of water. After drying, the fabric is heat-set for a minute at 200° C. and then subjected to a reducing treatment in sodium dithionite. A red violet shade of good general fastness is obtained.

EXAMPLE 35

A fabric of ethylene glycol polyterephthalate fibres is foularded in a solution of 10 parts of the dyestuff of Example 1 in 1000 parts by volume of trichloroethylene, dried and heat-set for 1 minute at 180° C. and then subjected to a reducing treatment. A ruby shade of good general fastness is obtained.

We claim:
1. A dyestuff represented by the structural formula:

$$A-N=N-\underset{Y}{\overset{X}{\underset{}{\bigcirc}}}-N(CH_2)_n-Z$$

in which A is 4-chlorophenyl, 4-cyanophenyl, 2,4-dicyanophenyl, 4-methylsulphonylphenyl, 4-carbomethoxyphenyl, 4-carbethoxyphenyl, 2,4-dichlorophenyl, 4-chloro-2-trifluoromethylphenyl, 2-cyano-4-chlorophenyl, 4-chloro-2-carbomethoxyphenyl, 4-cyano-2,6-dichlorophenyl or:

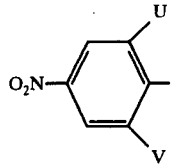

wherein
U and V are the same or different and each represents hydrogen, chlorine, bromine, nitro, cyano, carbalkoxy containing 2 to 5 carbon atoms or alkylsulphonyl containing 1 to 4 carbon atoms,
X is hydrogen, methyl, methoxy or ethoxy,
Y is hydrogen, chlorine, methyl, methoxy, formylamino, acetylamino, 4,4,5,5,5-pentafluorovalerylamino, benzoylamino, phenylacetylamino or cinnamoylamino,
Z is $-O-CO-CH_2CH_2C_2F_5$, $-CO-O-CH_2CH_2C_2F_5$ or, provided that Y is $-NH-CO-CH_2CH_2C_2F_5$, hydrogen, hydroxy, cyano, carbalkoxy containing 2 to 5 carbon atoms, acetyloxy, propionyloxy, butyryloxy or valeryloxy,
n is 1, 2, or 3, and either
R is alkyl containing 1 to 4 carbon atoms, said alkyl being unsubstituted or substituted by one hydroxy, cyano, carbalkoxy containing 2 to 5 carbon atoms, acetyloxy, propionyloxy, butyryloxy or valeryloxy,
or R is $-(CH_2)_n-Z'$, $Z'$ being $-O-CO-CH_2CH_2C_2F_5$ or $-CO-O-CH_2CH_2C_2F_5$.

2. A dyestuff according to claim 1 in which Y is $-NH-CO-CH_2CH_2C_2F_5$, Z is hydrogen, hydroxy, cyano, carbalkoxy containing 2 to 5 carbon atoms, acetyloxy, propionyloxy, butyryloxy or valeryloxy and R is alkyl containing 1 to 4 carbon atoms, said alkyl being unsubstituted or substituted by one hydroxy, cyano, carbalkoxy containing 2 to 5 carbon atoms, acetyloxy, propionyloxy, butyryloxy or valeryloxy.

3. Mixture of dyestuffs of the formula given in claim 1.

4. A dyestuff represented by the structural formula:

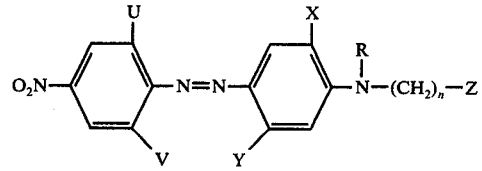

wherein
U and V are the same or different and each represents hydrogen, chlorine, bromine, nitro, cyano, carbalkoxy containing 2 to 5 carbon atoms or alkylsulphonyl containing 1 to 4 carbon atoms;
X is hydrogen, methyl, methoxy or ethoxy;
Y is hydrogen, chlorine, methyl, methoxy, formylamino, acetylamino, 4,4,5,5,5-pentafluorovalerylamino, benzoylamino, phenylacetylamino or cinnamoylamino;
Z is $-O-CO-CH_2CH_2C_2F_5$, $-CO-O-CH_2CH_2C_2F_5$ or, provided that Y is $-NH-CO-CH_2CH_2C_2F_5$, hydrogen, hydroxy, cyano, carbalkoxy containing 2 to 5 carbon atoms, acetyloxy, propionyloxy, butyryloxy or valeryloxy;
n is 1, 2 or 3; and either
R is alkyl containing 1 to 4 carbon atoms, said alkyl being unsubstituted or substituted by one hydroxy, cyano, carbalkoxy containing 2 to 5 carbon atoms, acetyloxy, propionyloxy, butyryloxy or valeryloxy,
or R is $-(CH_2)_n-Z'$, $Z'$ being $-O-CO-CH_2CH_2C_2F_5$ or $-CO-O-CH_2CH_2C_2F_5$.

* * * * *